April 3, 1962 R. A. SPROULE 3,028,546
LIQUID CONDUCTIVITY MEASURING CELL
Filed May 26, 1958 2 Sheets-Sheet 1

INVENTOR
ROBERT ANDREW
SPROULE
By Irwin S. Thompson
ATTY.

April 3, 1962 R. A. SPROULE 3,028,546
LIQUID CONDUCTIVITY MEASURING CELL
Filed May 26, 1958 2 Sheets-Sheet 2
FIG. 5.
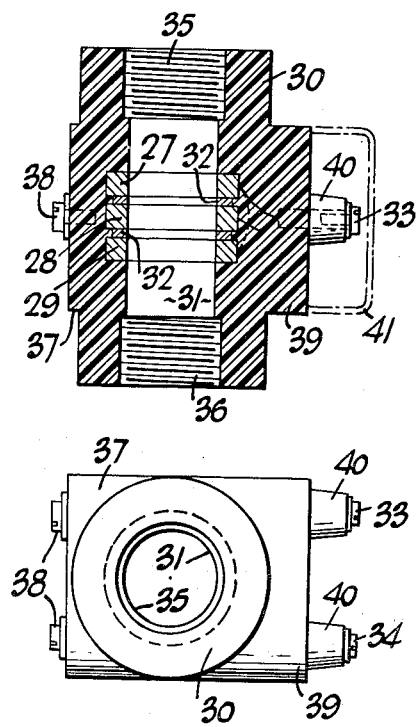
FIG. 6.
FIG. 7.
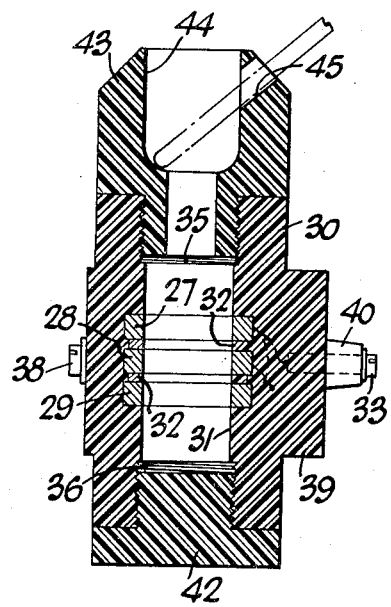
FIG. 8.
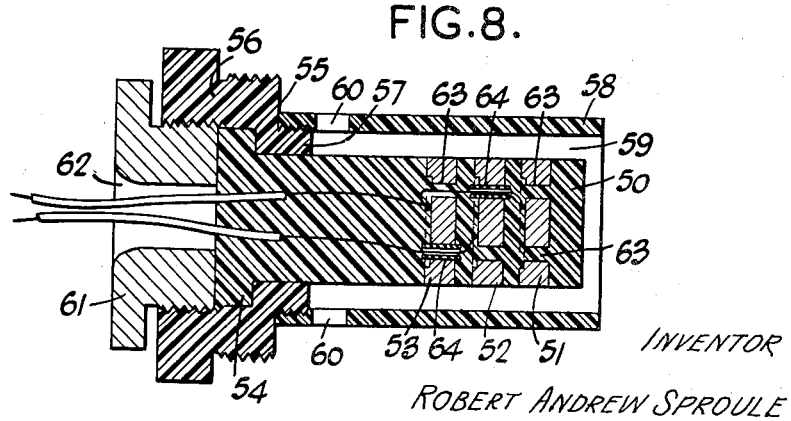
INVENTOR
ROBERT ANDREW SPROULE
By Irwin S. Thompson
ATTY.

United States Patent Office 3,028,546
Patented Apr. 3, 1962

3,028,546
LIQUID CONDUCTIVITY MEASURING CELL
Robert Andrew Sproule, Letchworth, England, assignor to Electronic Switchgear (London) Limited, Letchworth, England, a British company
Filed May 26, 1958, Ser. No. 737,654
13 Claims. (Cl. 324—30)

This invention relates to liquid conductivity measuring cells such as are employed in apparatus for measuring liquid conductivities generally and in particular in apparatus for continuously monitoring the condition of a liquid supply in industrial equipment, for instance, a boiler feed-water supply.

Hitherto liquid conducivity measuring cells have been constructed mainly of glass, usually in the form of a tube with radial apertures therethrough, and within which are disposed two spaced electrodes. Ideally, these electrodes should be of accurately predetermined area and at an accurately predetermined spacing distance apart. For example, to measure the conductivity of a standard unit of 1 cubic centimetre of liquid two parallel square plates exactly 1 centimetre side and exactly 1 centimetre apart are required. In practice it is not feasible to construct such known devices to have a particular exact area of electrode and electrode spacing distance and in consequence each individual cell, after manufacture, has to be measured against a standard and provided with a constant factor number which is subsequently used in calculations to modify any measurements which are made with the cell. While such individual cell calibration and the need for employment of the determined constant factor number in subsequent calculations may not be of undue disadvantage in laboratory use, it becomes extremely disadvantageous in industrial applications where the substitution or replacement of one cell by another, on the occasion of breakage or the like, can render the whole of the monitoring equipment useless until it has been readjusted in accordance with the particular constant value of the new cell. A further disadvantage of existing, mainly glass, devices is their high cost and extreme fragility especially to mechanical damage by mis-handling and/or thermal shock while in use.

The object of the present invention is to provide a simplified and cheapened construction of such conductivity measuring cells and in accordance with the broadest aspect of the invention the cell comprises at least two separate carbon electrodes embedded within a body of suitable insulating material, such as a mouldable plastic material, such carbon electrodes being so arranged that surface areas thereof are exposed as parts of a machined surface, such as that of a bored hole, made on or in the body of insulating material.

In order that the nature of the invention may be more readily understood, a number of embodiments thereof will now be described in greater detail with reference to the accompanying drawings, in which:

FIG. 5 shows in axial cross-section another form of conductivity measuring cell embodying the invention and adapted for installation in a continuous liquid flow line of an industrial equipment.

FIG. 6 is an end view of the cell shown in FIG. 5.

FIG. 7 is an axial cross-section of a laboratory type cell derived from the cell shown in FIG. 5 with the aid of additional parts, while FIG. 8 is an axial cross-section through a further embodiment of the invention.

Figure 1:
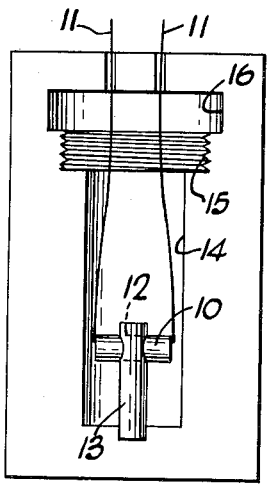
FIG. 1 is an axial cross-section through a mould device employed in forming a conductivity measuring cell according to the invention.
Figures 2, 3:
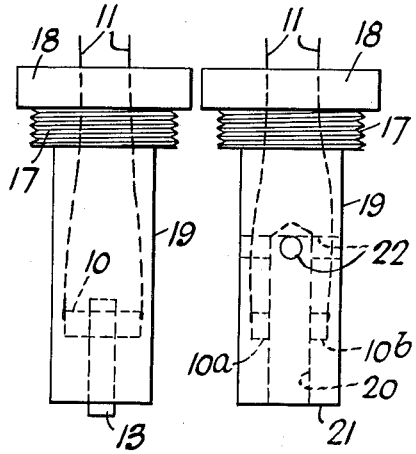
FIG. 2 is an elevational view of the moulded article as removed from the mould of FIG. 1.
FIG. 3 is an elevational view of the completed cell derived from the moulded article of FIG. 2.

Referring first to FIGS. 1, 2 and 3, one method of manufacturing a cell of simple form in accordance with the invention will first be described. Use is made of a mould, conveniently formed as two similar halves, defining therein a chamber 14 which is of circular cross-section and which leads at one end into an enlarged region 15 having thread-forming surfaces therearound. This region 15 leads in turn to a still larger diameter cap-forming region 16.

A single short length of carbon rod 10, FIG. 1, of accurately known diameter is first provided at each end with an attached electrical connecting wire 11 such as by copper plating the two ends of the rod and then soldering the two wires respectively thereto. This rod 10 with its attached wires is then positioned within a transverse aperture 12 formed in a short post 13 of any suitable material, e.g. a moulded plastic material, and the latter then placed at the end of the mould chamber 14 opposite that of the regions 15 and 16 by location within a subsidiary locating hole or recess within the mould. When properly positioned the rod 10 lies parallel with the adjacent end surface of the chamber 14 and at a given spacing distance therefrom. The rod also lies so that its axis coincides with a diameter of the chamber 14.

Suitable moulding material, preferably in liquid or semi-liquid form, is then introduced into the interior of the mould, i.e. into chamber 14 and regions 15, 16, and is caused to set. Thereafter, the moulded body removed from the chamber has the form shown in FIG. 2, consisting of a cylindrical part 19 having an enlarged screw-threaded region 17 at one end, the latter in turn leading to a still larger diameter cap 18. The connecting wires 11 from the opposite ends of the carbon rod 10 are embedded within the material of the moulded body and emerge from the outer end surface of the cap 18. The post 13 is, at this time, still embedded within the moulded body.

An axial hole, as shown at 20 in FIG. 3, is now drilled in the body part 19 from the end 21, this hole being arranged so that its axis is at right angles to the length of the rod 10 and so that such axis passes precisely through the axis of the rod. The hole is of appreciably larger diameter than the rod 10 whereby such rod is separated into two portions 10a, 10b, the cross-sectional exposed inner end surfaces of which are respectively located in and are contiguous with the opposing side regions of the drilled hole. The hole is continued along the length of the part 19 to a depth considerably greater than that of the position of the carbon rod 10 and transverse holes 22 are then provided in the body 19 in the vicinity of the inner end of the hole 20 thereby to provide a number of flow conduits for permitting the liquid whose conductivity is to be measured to flow past the exposed surfaces of the electrodes 10a, 10b. The diameter of the hole 20 is preferably such that the post 13 is completely removed.

As the cross-sectional area of the carbon rod is accurately controllable and is known before moulding, correspondingly accurate control of the eventual cell characteristics is obtainable merely by accurate control of the diameter of the drilled hole 20.

As a moulding material for the insulating body, one of the casting resins of the epoxy group, e.g. that known under the registered trademark Araldite, is preferably employed as such materials are substantially inert to most liquids likely to be used with the device.

As an alternative to the employment of direct moulding of the carbon rod 10 within the body material, a prefabricated body of suitable insulating material may be provided and a first diametral hole drilled therein for the reception of the carbon rod which is then placed in the hole and sealed in position by plugs of insulating material, such as Araldite, at each end. Therefore, a central axial hole is provided as already described with reference to FIG. 3 in order to separate the carbon rod into two portions and further transverse holes made to communicate with the drilled central hole so as to provide liquid flow facilities.

Figure 4:
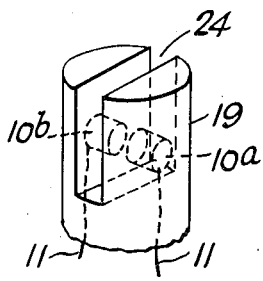
FIG. 4 is a fragmentary perspective view illustrating a modification.

An alternative arrangement is shown in FIG. 4 where the embedded carbon rod 10 is divided by means of a transverse slot 24 of known width made in the end of the insulating body containing the carbon rod so as to divide the latter into its separate parts 10a and 10b.

FIG. 5 shows a further embodiment of a preferred form of the invention in which the electrodes are in the form of three carbon rings 27, 28, 29 held in axial spaced relationship and embedded within a body 30 of moulded plastic material so that their inner surfaces form parts of a bore 31 passing through the body 30.

In the preferred method of manufacture of this particular embodiment three carbon rings (or discs) 27, 28, 29 of accurately known thickness are first each provided with electrical connections as by copper plating a part or a whole of their peripheral outer surfaces and then soldering wires thereto. These rings are then secured together in accurately known axial spacing relationship by means of insulating spacer elements 32 which may again be of ring or disc form and of suitable moulded plastic material. The securing of the carbon rings to the spacer elements may be effected by means of any suitable adhesive such as an Araldite compound. The two outer carbon rings 27 and 29 are interconnected electrically by connecting their respective connecting wires to one external terminal 33 while the central carbon ring 28 has its connecting wire connected to a second external terminal 34. The assembled carbon electrodes and spacer elements are then supported within a mould of suitable shape along with the metallic terminal spills which are to form the eventual external electrical connection terminals. Moulding material is then introduced and caused to set to form the body 30 of the shape as shown whereafter an axial hole along a line coincident or substantially coincident with the common axis of the carbon electrodes and their associated spacer elements embedded within the moulded block, is drilled or otherwise machined right through the block from one end to the other to form the bore 31. This opposite outer ends of this central hole are then enlarged and screw threaded as shown at 35 and 36 for connection to conduit or like means of an industrial equipment.

The diameter of the bore 31 is accurately controlled so that the cell, after manufacture, has the required characteristics determined by the exposed area of each of the carbon electrodes and their accurately controlled physical spacing distance.

At one side the body 30 is formed with a short extension 37 provided with tapped apertures therein for receiving securing screws 38 while on the opposite side such body has a rather longer extension 39 upon which are formed integrally moulded posts 40 for housing the spills for the terminals 33 and 34. These terminals may be covered by a removable cap 41 as shown in chain dotted lines.

The advantage of the cell construction shown in FIGS. 5 and 6 is that the actual position of the hole forming the bore 31 need not be so accurately controlled whereby its axis coincides precisely with the axis of the carbon electrodes 27, 28, 29 and the associated spacer elements. Provided such hole is formed with its axis at right angles to the planes of the various electrodes, the actual position of the hole within each electrode is not important.

A cell of the type shown in FIGS. 5 and 6 is particularly adapted to industrial use for incorporation in a liquid flow line such as that of a boiler water feed supply but it may readily be converted into a normal laboratory type cell as shown in FIG. 7 by the addition of a closure plug 42 of moulded plastic material at its lower end and a filling plug 43 at its upper end. Such filling plug 43 preferably has an enlarged outer filling orifice 44 and may be provided with a suitable side entry hole 45 for the reception of a thermometer for temperature checking purposes.

FIG. 8 shows a further embodiment of the invention comprising a cylindrical body part 50 of moulded insulating material within which are embedded three spaced carbon electrodes in the form of discs (or rings) 51, 52, 53 disposed parallel with one another and at accurately controlled axial spacing distances apart from each other. The insulating body 50 has an enlarged diameter cap 54 at one end which is arranged to be received within a seating 55 formed in a head portion 56 also of insulating material and provided with a reduced diameter screw threaded extension 57 adapted to receive a sleeve 58 of insulating material for covering the body 50 and its carbon electrodes thereby to form an annular liquid flow passage 59 past the electrodes. This sleeve is provided with a number of radial ports 60 near the end attached to the head portion 56. The cylindrical body 50 is held in position by means of a further removable gland member 61 having a central aperture 62 through which the outwardly extending connecting leads 63 from the carbon electrodes can pass.

The carbon electrodes 51, 52, 53 are generally similar to those shown in FIGS. 5, 6 and 7 and may be of either disc or ring form and of accurately controlled axial thickness. They may either be held in their requisite accurately controlled axially spaced positions by suitable jig means during molding or, alternatively, initially secured to each other by means of separate insulated spacing rings as in FIGS. 5, 6 and 7. Each carbon disc or ring is provided with two spaced apertures 63 for permitting the passage of the necessary electrical connecting wires there through with the aid of insulating tubes 64. The discs or rings are connected as in the case of FIGS. 5, 6 and 7 with the central ring or disc 52 joined to one terminal wire and the two flanking rings or discs 51, 53 joined together and to the other terminal wire. After moulding in position the external surface of the cylindrical body 50 and the integrally moulded carbon electrodes is subjected to a machining operation to cause it to have a predetermined and accurately controlled diameter which, in conjunction with the controlled thickness and axial spacing of the carbon electrodes, ensures that the subsequent cell has a predetermined characteristic.

The use of three separate spaced electrode elements, such as the rings 27, 28, 29 of FIGS. 5 and 6 or the discs 51, 52 and 53 of FIG. 8, with the two outermost elements interconnected as one electrode and the intermediate element forming the other electrode is particularly advantageous when the device is used in association with a liquid flow pipe of metal. By arranging that such outermost electrode elements are at the same potential, e.g. earthed, as the pipework any current conduction between them (with its consequent modification of the effective constant value of the cell) is avoided. To facilitate proper connection, the two cell terminals are appropriately marked.

Various other modifications will be obvious to those skilled in the art and are intended to be included within the scope of the invention. For example, instead of employing a single carbon rod which is subsequently divided as described with reference to FIGS. 1, 2, 3 and 4, separate portions of carbon rod each provided with a connecting wire may be used and moulded in position so as to project outwardly on diametrically opposite sides of a rod-like body of insulating material which is then finished externally such as by turning or grinding to a given diameter and afterwards positioned within a suitable liquid confining means such as a surrounding cylinder. Another modification may utilise a plurality of separate sections of a carbon cylinder in the formation of the necessary electrodes. For instance, four curved part-cylindrical portions may be arranged and moulded within a body of moulded insulating material at positions which are 90° displaced from one another. A central axial hole may then be drilled in the material whereby the surface of such hole includes a part of each of the separate carbon plates in the form of four separate arcuate surfaces of known size at angularly displaced positions around the wall of the hole. Again, by accurate control of the size of the hole and the thickness of the plates, so the characteristic of the cell can be given a desired predetermined value. The various sections of the carbon body may initially be united as a one-piece element by a part thereof which is subsequently removed by the drilling operation.

The cells according to the invention, in addition to being robust mechanically and insensitive to thermal shock conditions, are extremely cheap to construct compared with those of more conventional form and, moreover, have the advantage that each cell made to given dimensions is sufficiently similar to other cells made to the same dimensions as to become interchangeable therewith without any necessity of readjusting the associated apparatus.

I claim:

1. A liquid conductivity measuring cell comprising a body of moulded electric insulating material having embedded therein a stacked assemblage of first, second and third rectangular section rings of carbon separated from each other by interposed spacing rings of electric insulating material, said carbon rings and said spacing rings each having accurately predetermined axial thickness dimensions, a machined borehole in said body of insulating material passing through the body material of each of said rings, said borehole providing a cylindrical surface of accurately predetermined and constant diameter and of which the exposed cylindrical carbon surfaces in each of said carbon rings form axially spaced and precisely contiguous parts, first electric conductor means embedded in said body of insulating material interconnecting said first and third carbon rings and providing a first external electrical connection means and further electric conductor means embedded in said body of electric insulating material forming a second external electrical connection means connected to said second carbon ring lying intermediate said first and third carbon rings.

2. A liquid conductivity measuring cell comprising a body of moulded electric insulating material having embedded and enclosed therein a stacked assemblage of first, second and third rectangular section rings of carbon separated from each other by interposed spacing rings of electric insulating material, said carbon rings and said spacing rings each having accurately predetermined axial thickness dimensions, a machined borehole in said body of insulating material and passing through the body material of each of said carbon and spacing rings directed along an axis normal to the respective planes of said carbon rings, said borehole providing a cylindrical surface of accurately predetermined constant diameter and of which the exposed cylindrical surfaces in each of said carbon rings form axially spaced and precisely contiguous parts, first electric conductor means embedded in said body of insulating material interconnecting said first and third carbon rings and providing a first external electrical connection means and further electric conductor means also embedded in said body of electric insulating material forming a second external electrical connection means connected to said second carbon ring lying intermediate said first and third carbon rings.

3. A liquid conductivity measuring cell comprising a body of moulded electric insulating material having embedded and enclosed therein a stacked assemblage of parallel disposed first, second and third flat-sided rings of carbon separated from each other by interposed spacing rings of electric insulating material, said carbon rings and said spacing rings each having accurately predetermined axial thickness dimensions, and a machined borehole in said body of insulating material passing through the body material of each of said carbon and spacing rings along an axis lying normal to the planes of said rings, said borehole providing a cylindrical surface of accurately predetermined constant diameter and of which the exposed cylindrical surfaces in each of said carbon rings form axially spaced and precisely contiguous parts.

4. A liquid conductivity measuring cell comprising a body of moulded electric insulating material having embedded therein a stacked assemblage of first, second and third carbon plates at accurately predetermined spacing distances from each other, said carbon plates each having an accurately predetermined thickness dimension, a machined cylindrical surface around the outside of said body and said first, second and third carbon plates, said machined surface providing a cylindrical surface of accurately predetermined constant diameter which exposes cylindrical surfaces of said spaced carbon plates as axially spaced and precisely contiguous parts of such machined surface, first electrical conductor means embedded in said insulating body and interconnecting said first and third carbon plates and forming first external connection means and second electrical conductor means embedded in said insulating body forming second external connection means electrically connected to said second carbon plate lying intermediate said first and third carbon plates.

5. A liquid conductivity measuring cell comprising a body of moulded electric insulating material having embedded therein a stacked assemblage of first, second and third parallel-sided carbon plates at accurately predetermined spacing distances from each other, said carbon plates each having an accurately predetermined thickness dimension, a machined cylindrical surface around the outside of said body and said first, second and third carbon plates, said machined surface providing a cylindrical surface of accurately predetermined constant diameter with its axis lying normal to the respective planes of said carbon plates and which exposes cylindrical surfaces of said spaced carbon plates as axially spaced and precisely contiguous parts of said machined surface, first electrical connection means embedded in said insulating body and interconnecting said first and third carbon plates and forming first external connection means and second electrical connection embedded in said insulating body and forming second external connection means electrically connected to said second carbon plate lying intermediate said first and third carbon plates.

6. A liquid conductivity measuring cell comprising a body of moulded electric insulating material have embedded therein a stacked assemblage of first, second and third parallel-sided carbon plates at accurately predetermined spacing distances from each other, said carbon plates each having the same accurately predetermined thickness dimension and a machined cylindrical surface around the outside of said body and said first, second and third carbon plates, said machined surface providing a cylindrical surface of accurately predetermined constant diameter having its axis normal to the respective planes of said carbon plates and which exposes cylindrical surfaces of said spaced carbon plates as axially spaced and precisely contiguous parts of said machined surface.

7. A liquid conductivity measuring cell comprising a body of moulded electric insulating material having embedded therein a stacked assemblage of first, second and third rectangular section rings of carbon separated from each other in parallel relationship by interposed spacing rings of electric insulating material, said carbon rings and said spacing rings each having an accurately predetermined axial thickness dimension, a machined borehole right through said body of insulating material and through the body material of said first, second and third carbon rings and the interposed spacing rings, said borehole being directed normal to the respective planes of said carbon rings and forming a cylindrical surface of accurately predetermined constant diameter to expose cylindrical inner surfaces of said carbon rings as axially spaced and precisely contiguous parts, a counter-bore in each end of said borehole, each counter-bore being internally screw threaded, first and second electric terminal means on said moulded body, a first electrical connection means embedded in said moulded body and extending between said first electric terminal means and each of said first and third carbon rings and second electrical connection means also embedded in said moulded body extending between said second terminal means and said second carbon ring lying intermediate said first and third carbon rings.

8. A liquid conductivity measuring cell comprising a body of moulded electric insulating material having embedded therein a stacked assemblage of first, second and third rectangular section rings of carbon in parallel spaced relationship to each other, said carbon rings each having an accurately predetermined axial thickness dimension and spacing dimensions being accurately predetermined, a machined borehole of constant diameter right through said moulded body and the body material of said first, second and third carbon rings, said borehole having its axis directed normal to the respective planes of said carbon rings and forming a cylindrical surface of accurately predetermined constant diameter to expose cylindrical inner surfaces of said carbon rings as axially spaced and precisely contiguous parts thereof and a counter-bore in each end of said borehole, each counter-bore being internally screw threaded.

9. A liquid conductivity measuring cell comprising a body of moulded electric insulating material having embedded therein a stacked assemblage of first, second and third carbon plates disposed in spaced parallel relationship to each other, said carbon plates each having an accurately predetermined thickness dimension and said spacing distances between adjacent carbon plates being also of accurately predetermined value, a machined cylindrical outer surface of predetermined accurately controlled constant diameter formed around said body of insulating material and said embedded carbon plates, said cylindrical surface having its axis normal to the plane of each of said carbon plates and serving to expose cylindrical edge surfaces of said carbon plates as axially spaced and precisely contiguous parts of such machined cylindrical surface, a flange at one end of said insulating body, a gland nut containing a bore and a counter-bore for receiving said cylindrical body and said flange of said composite body of insulating material and carbon plates, an electric insulating sleeve of inner diameter greater than the outer diameter of said cylindrical body disposed around and coaxial with said cylindrical body, said sleeve being rigidly secured at one end to said gland nut, and transverse ports in said sleeve near its point of attachment to said gland nut to provide a liquid flow path of annular cross-section past said exposed machined cylindrical surfaces of said carbon plates, first electrical connection means embedded in said moulded cylindrical body and interconnecting said first and third carbon plates and second electrical connection means also embedded in said moulded cylindrical body and connected to said intermediate second carbon plate.

10. A liquid conductivity measuring cell comprising a body of moulded electric insulating material having embedded therein a stacked assemblage of first, second and third carbon parallel-sided plates disposed in spaced parallel relationship to each other, said carbon plates each having the same accurately predetermined thickness dimension and said spacing distances between adjacent carbon plates being also of the same accurately predetermined value, a machined cylindrical outer surface of predetermined accurately controlled constant diameter formed around said composite body of insulating material and embedded carbon plates, said cylindrical surface having its axis normal to the respective planes of said carbon plates and serving to expose cylindrical edge surfaces of said carbon plates as axially spaced and precisely contiguous parts of such machined cylindrical surface and an insulating sleeve of inner diameter greater than the outer diameter of said cylindrical body disposed around and coaxial with said cylindrical body.

11. A liquid conductivity measuring cell which comprises at least two carbon electrodes embedded within a body of insulating material, such carbon electrodes being arranged so that surface areas thereof are exposed as precisely contiguous parts of a machined external surface made on said body of insulating material and through the carbon body material of said electrodes.

12. A liquid conductivity measuring cell which comprises at least two carbon discs or rings embedded within a body of insulating material at predetermined axial spacing distances apart, such carbon electrodes being arranged so that surface areas thereof are exposed as precisely contiguous parts of a machined external surface of predetermined cross-sectional dimension made on said body of insulating material and through the carbon body material of said electrodes.

13. A liquid conductivity measuring cell which comprises at least two carbon electrodes embedded within a body of insulating material, such carbon electrodes being arranged so that surface areas thereof are exposed as precisely contiguous parts of a machined internal surface of a hole of known diameter made in said body of insulating material and through the carbon body material of said electrodes, said carbon electrodes being arranged so that the exposed machined surface areas thereof lie at diametrically opposed positions within said hole.

References Cited in the file of this patent

UNITED STATES PATENTS

| | | |
|---|---|---|
| 1,807,821 | Behr | June 2, 1931 |
| 2,122,363 | Christie | June 28, 1938 |
| 2,888,640 | Eckfeldt et al. | May 26, 1959 |